Jan. 23, 1940. W. TRAUTNER 2,188,067
SIGNAL LAMP BRACKET
Filed Nov. 15, 1937 3 Sheets-Sheet 1
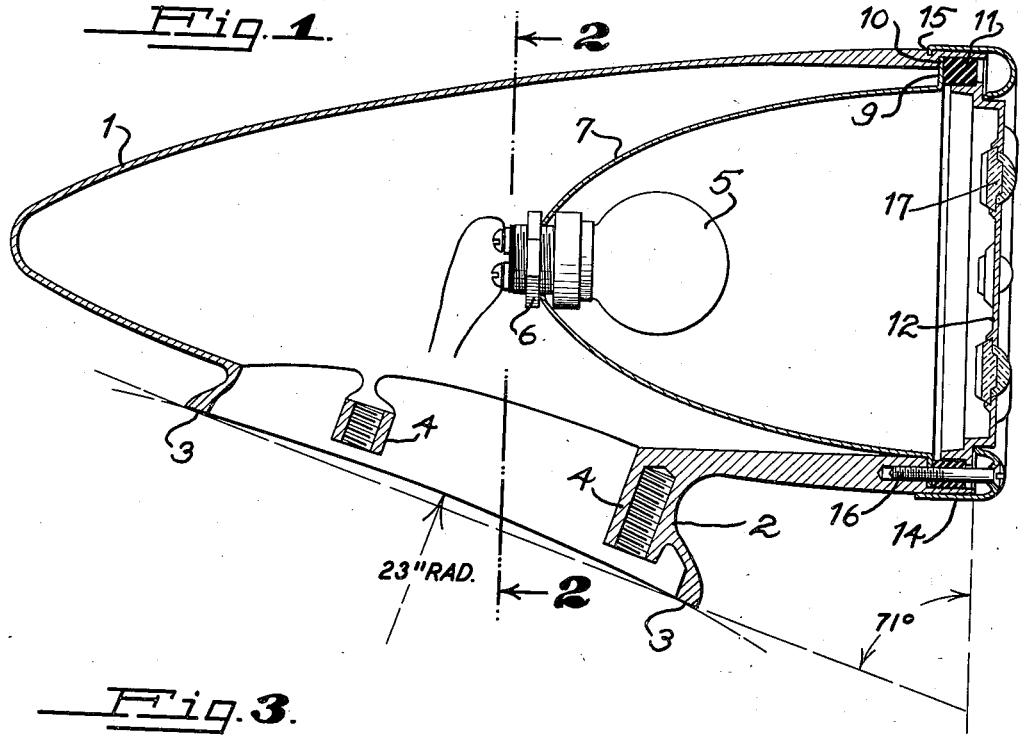
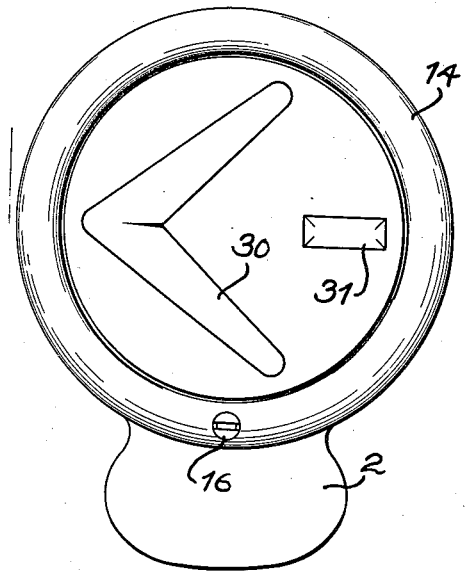
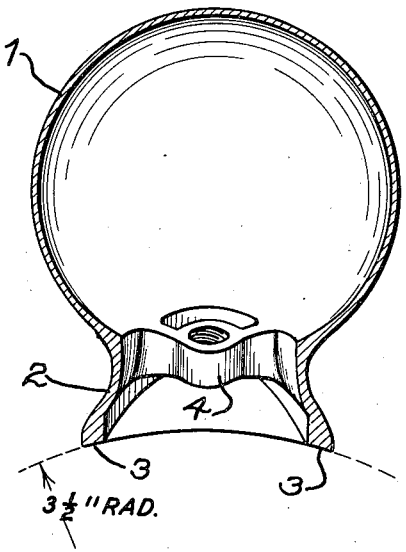
INVENTOR,
WAGN TRAUTNER.
BY Lippincott & Metcalf
ATTORNEYS.

Jan. 23, 1940.                    W. TRAUTNER                    2,188,067
                                SIGNAL LAMP BRACKET
                              Filed Nov. 15, 1937              3 Sheets-Sheet 2
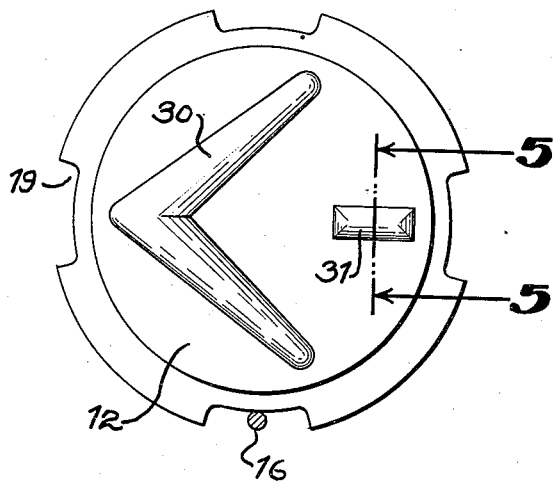
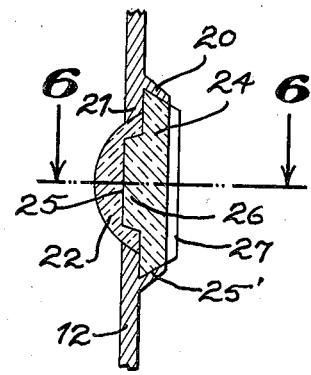
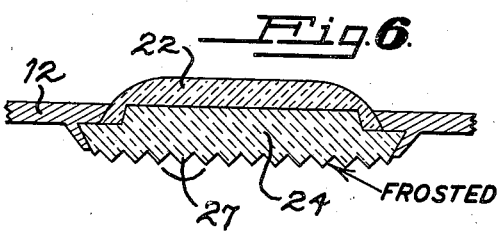
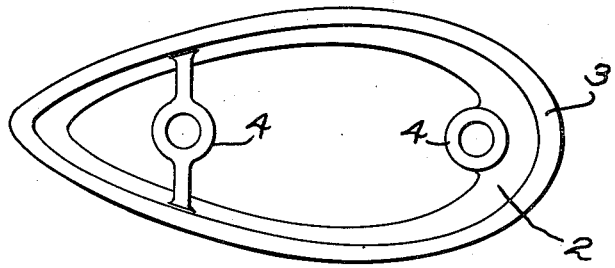
INVENTOR.
WAGN TRAUTNER.
BY
Lippincott & Metcalf
ATTORNEYS.

Jan. 23, 1940.　　　　　W. TRAUTNER　　　　　2,188,067
SIGNAL LAMP BRACKET
Filed Nov. 15, 1937　　　　　3 Sheets-Sheet 3

INVENTOR.
WAGN TRAUTNER
BY
Lippincott & Metcalf
ATTORNEYS.

Patented Jan. 23, 1940

2,188,067

UNITED STATES PATENT OFFICE 2,188,067

SIGNAL LAMP BRACKET

Wagn Trautner, Springdale, Ohio, assignor, by mesne assignments, to Signacator Systems, Inc., Oakland, Calif., a corporation of California Application November 15, 1937, Serial No. 174,573

3 Claims. (Cl. 177—329)

My invention relates to a bracket for attaching devices to surfaces common to the majority of existing automotive vehicles, and more particularly to a bracket having such a base and carrying a signal lamp, although it will be obvious to those skilled in the art that other devices may be mounted thereon, such as radio antennae, ornaments, etc.

Among the objects of my invention are: To provide a bracket having a basal surface which can be applied to and will fit a surface common to the majority of existing automotive vehicles; to provide a bracket carrying an automotive accessory that can be installed on the majority of existing automotive vehicles, and which will fit a surface thereon; to provide a signal lamp having a base shaped to fit a surface common to the majority of existing automotive vehicles; to provide such a lamp wherein a viewing face is provided at such a definite angle to the base that when the lamp is mounted on the surface common to the majority of the existing motor vehicles, the viewing face is in a plane perpendicular to the ground and at an angle to be viewed properly; to provide a signal lamp which can be installed on existing automotive vehicles as accessory equipment, in a position where it will fit and where the angles of the lamp are such as to provide proper viewing of the lamp from other vehicles and pedestrians; to provide a signal lamp which can be installed on existing automotive vehicles as accessory equipment, and which will fit in a number of places on the majority of existing automobiles and trucks; to provide a signal lamp having a base shaped to fit a curved surface common to the majority of existing automotive vehicles; to provide a viewing screen or lens as a part of said lamp, positioned with respect to the base of the lamp, so that when the lamp is installed on said surface the viewing lens or screen is in the proper position to be viewed by the onlooker; to provide an accessory lamp that will fit existing automobiles; and to provide a simple and efficient accessory lamp, easily mountable upon existing automotive vehicles.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

The mounting toll of deaths upon the highways caused by automotive vehicles has brought pressure on the manufacturers of automotive vehicles for an adequate directional signalling system. It is obvious, however, that in any such signalling system, signalling lamps will have to be used in order to be effective at night, and if such signalling lamps are to be used, these lamps must fit not only upon vehicles being produced in a factory simultaneously with the installation of a signalling system thereupon, but must also be adapted for auxiliary equipment for use upon all existing automotive vehicles, with a minimum of installation charge and a minimum of mutilation of the vehicle body.

It is therefore important that the signal lamp be mounted on a bracket having a base that will fit the majority of existing motor vehicles, and the present invention is directed toward such a base and bracket. While I will describe this base and bracket as carrying a vehicle signal light, it is obvious that the same bracket may be utilized to install upon existing motor vehicles any exterior accessory as may be desired.

I have found, by careful examination and painstaking research, that there will exist upon practically every automobile or truck, surfaces which over a limited area thereof, are substantially common to all the automotive vehicles; and while I am not prepared to state why this fact occurs, I am of the opinion that this curved surface is probably one which has to do with the elastic limits of the metals utilized in forming automotive bodies, and recurs in various positions thereon.

It should be distinctly understood, however, that these curves, over a wide area, are not identical but do have component curvatures in common over areas which can readily be found by trial, and I have not yet been able to find an automotive vehicle upon which the base herein described and claimed will not fit at one place or another. Furthermore, as another part of my invention, I have found that there is an angle cooperative with the angle of the base along which a signalling surface can be mounted, so that when the base is applied to the common vehicle surface, this signalling surface will be in a plane perpendicular to the ground and in the proper position to be viewed.

I have thus been able to provide an accessory which, by means of the base herein described and claimed, can be mounted on practically all existing motor vehicles. The base will fit a surface thereon, and the device may be permanently mounted on the vehicle without cutting or fitting, with the drilling of a few holes, and with the assurance that the base will fit, thereby making a finished installed accessory which, as far as can be seen from the exterior, was part of the original vehicle.

Broadly, my invention comprises a bracket having a base with a narrow peripheral surface describing an egg or streamline shape, and curved from front to rear over the long dimension thereof to fit a cylindrical surface of substantially 23" radius. I have found that in conjunction with such a base a viewing surface, such as a lamp lens, may be installed at a fixed angle of substantially 71° to the chord passing through the ends of the cylindrical curvature along the long dimension of the base.

Referring to the drawings:

Fig. 1 is a longitudinal sectional view through a preferred embodiment of my invention, as applied to a signal lamp, showing basal curvature and lens plane angle.

Fig. 2 is a cross sectional view, taken as indicated by the line 2—2 in Fig. 1.

Fig. 3 is an end view of the lamp shown in Fig. 1.

Fig. 4 is a plan view of the lamp mask and index marker.

Fig. 5 is a cross sectional view of mask and index lens, taken as indicated by the line 5—5 in Fig. 4.

Fig. 6 is a longitudinal sectional view of the index lens and mask, taken as indicated by the line 6—6 in Fig. 5.

Fig. 7 is a plan view of the basal surface of the lamp.

Figure 8:
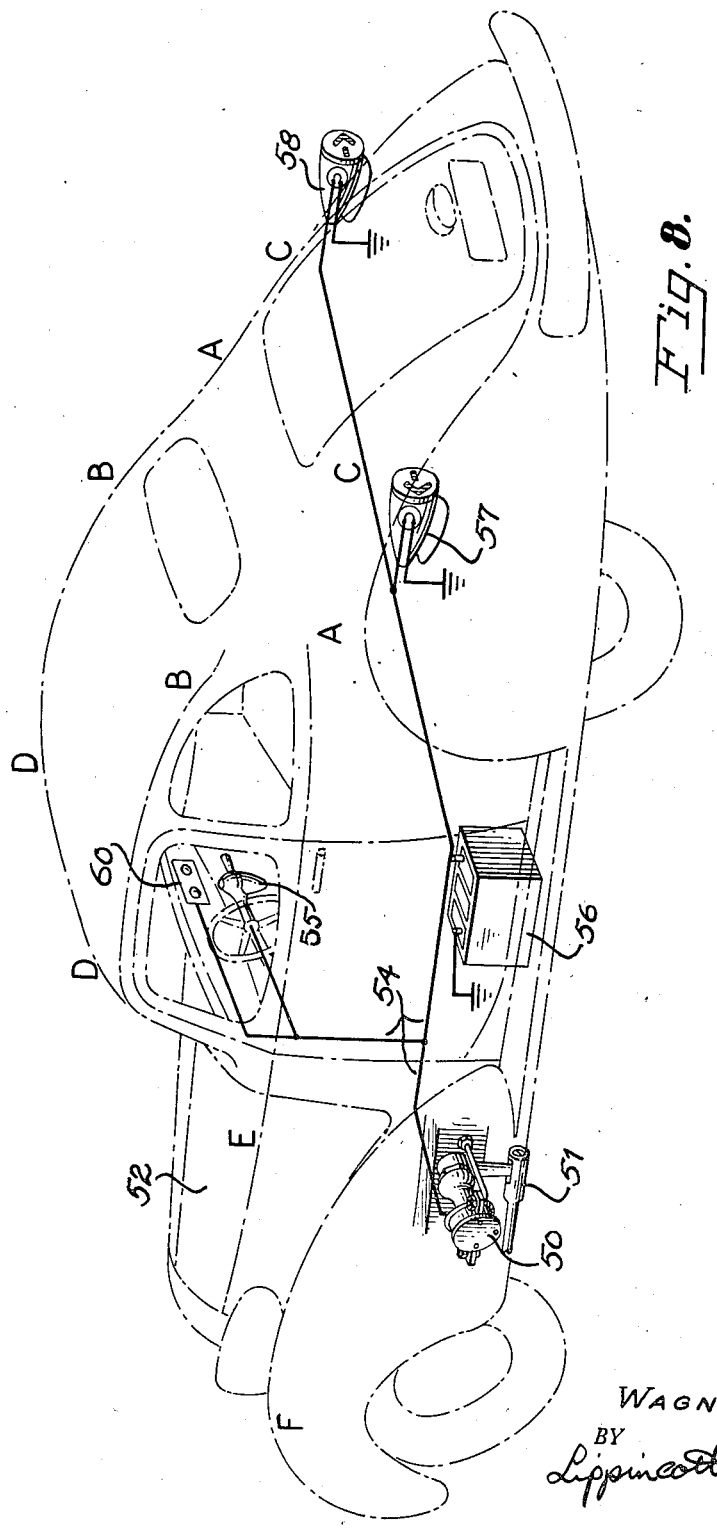
Fig. 8 is a diagrammatic view of an entire signalling system, utilizing the lamp of my invention installed upon rear fender surfaces of a vehicle, and connected as direction indicator signals in the vehicle signalling system.

Referring directly to the drawings for a more detailed description of my invention, a lamp house 1, preferably of streamline shape to conform with modern fashion, is provided with a hollow supporting bracket 2 terminating in a basal surface 3. A plan view of this basal surface describes an egg or streamline shape, such as shown in Fig. 7, the edges of the bracket being relatively thin.

The basal surface is curved to fit a cylinder of substantially 23" radius from front to rear of the surface along the long dimension thereof, and it is desirable, although not necessary, to curve the short dimensions of the basal surface to fit a 3½" radius, as shown in Fig. 2. The reason that this curvature is not necessary is that the 3½" radius only represents an average of the curvatures along this dimension, and deeper and unknown curvatures along this dimension may be accommodated by fastening the bracket to the automotive vehicle body by screws passing through the body metal and entering screw threads in mounting bosses 4, terminating sufficiently far above the plane of the basal surface so that the body metal may be drawn up into the interior of the bracket 2, but terminating sufficiently short of the basal surface to accommodate unknown curvatures.

Inasmuch as these cross curvatures, as they may be called, will vary, the 3½" radius curvature across the short dimension will not always be exactly right. However, it is an average value, and inasmuch as it is almost always desirable to utilize a thin gasket between the basal surface and the automotive body, such minor variations along the small dimension will not be noticed at all, nor will they disturb the fit.

An incandescent light 5 is positioned within the lamp house 1 in a lamp base 6, so that the lamp 5 is in the focus of a reflector 7. This reflector, of any common automotive type, has an outturned lip 9 fitting a shoulder 10 in the large open end of the lamp house, and the lip is held against the boss by a resilient gasket 11 against which is pressed a mask 12, the mask being maintained in place by a cover 14 fixed in position at the top by lug 15 and at the bottom by cover screw 16. The mask 12 supports an index lens 17, and the angle of the mask plane is preferably set at 71° to a line constituting a chord of the 23" cylindrical curvature passing through the longest dimension of the streamline basal surface shape.

Mask 12 is shown in plan in Fig. 4, and it will be seen that the mask edge is provided with four peripheral slots 19, spaced 90° apart, and each having a length of not less than 30° of the peripheral arc, thus allowing the index lens 12 to be rotated to fit conditions to be described later.

Figs. 5 and 6 show the preferred construction of the index marker. The mask 12 is provided on its inner surface with a lip 20 projecting inwardly, the main body of the mask projecting beyond lip 20 to form a mounting flange 21. The opposed surfaces of this mounting flange 21 are shaped to fit the curvature of an outside lens component 22, which is preferably semi-circular in section along its shortest dimension and preferably of colorless material. By colorless, I do not mean that it need be crystal clear, but I do desire that it shall at least be a white or nearly white material, or crystalline clear, preferably, however, the latter.

A rear component 24 is provided, wider than the front component 22, and having angular sides 25' so that lip 20 may be forced thereagainst to cooperate therewith to lock the entire structure together and to the mask. I prefer to join the front and rear components, at least over the major part thereof, to form a planar junction 25, and I prefer that this junction be cemented to remove double reflections and to prevent air bubbles therein, and I also prefer to make the center section 26 of the rear component thicker than the edge section. The rear surface of the rear or colored component facing light source 5 is provided with prismatic ridges 27, and all surfaces of these ridges are preferably frosted to reduce reflection therefrom.

I also prefer to form both front and rear components of this lens from mouldable plastics, or what is popularly known as "unbreakable glass", now well known in the industry. Under these circumstances, lip 20 may be readily applied with pressure against the various components of the plastic lens so that they will be held firmly in position, and as will readily be seen, when lip 20 is forced into final position, the entire lens is firmly locked in position in the mask slot.

I also prefer to run the prismatic ridges across the narrowest dimension of the lens in case a defined directional index is utilized, such as shown in Fig. 4, where one portion of the lens defines an arrow head 30 and another portion defines an arrow shaft 31. Other indexing configurations will of course be apparent immediately to those skilled in the art, and the cross section shown in Fig. 5, of course, may be changed in dimension so that the lens may be built without indexing characteristics for use, for example, as a stop light, where only a gross light source is needed and no other indication desired.

I prefer to illustrate the use of the lamp of my invention in conjunction with a directional signalling system, in which an automatic switch 50 is mounted on the quadrant nut of the steering gear 51 of an automobile 52, shown in dotted configuration in Fig. 8. This switch is so designed as to close a signalling circuit when the vehicle is moved from any immediate course. A wiring cable 54 leads from the steering gear switch, usually known as the automatic switch, to a hand switch 55 which has additional contacts therein which, under manual control, will energize the same signalling lamps as would be energized by turning of the steering gear. Current for the signalling lamps comes from vehicle battery 56, and the signalling lamps themselves, left signalling lamp 57 and right signalling lamp 58, embodying my present invention, are shown here as being mounted on the left and right rear fenders, respectively, of an automotive vehicle. Pilot lights 60 may be installed on the dash, as shown in the drawings.

All of the equipment shown in Fig. 8, with the exception of the vehicle battery, may be installed as auxiliary equipment on existing vehicles, and it will be found that if signal lamps 57 and 58 are provided with the basal surface as described above, that these lamps will fit on a number of places on practically every existing automobile. For example, they are shown in the drawings as being on the rear slope of the rear fenders, and in this position the lamps are in a vertical position. However, these lamps will also fit at points marked A on the curvature between the body sides and the back, and in this position the lamps will be nearly horizontal.

It is to adjust for these changes in angle between the vertical and horizontal that the adjustment slots 19 are provided in the index mask, inasmuch as the slots allow four 30° adjustments to be made to right and left of cap screw 16, so that in any angle between the vertical and horizontal the index marker can be made to point substantially right and substantially left. At the same time, when the basal surface is moved around adjacent points A to find the position it fits, the mask 12, being at an angle of 71° to the chord of the base, as described, will be in a plane perpendicular to the earth, and the lamp will point directly to the rear.

There are many other points on the automobile where the lamps will fit, with the mask in the proper plane and with the mask rotatable to give the proper index. These points, for example, are B—B at the junction of top and back. It is also possible to find curvatures at C—C, where the lamp base will fit and where there will be an intermediate index angle between the location as shown and points A on the side of the vehicle. In the front, the lamps will fit with the index window lens pointing forward at points D—D, at point E and the corresponding point on the other side of the vehicle, and at point F and the corresponding point on the opposite side of the vehicle.

Thus, not only are the surfaces to which the lamp of my invention may be applied common to all vehicles, but are common to many points on the same vehicle, and it is surprising how quickly the proper points can be found simply by placing the lamp base against the vehicle body at a likely location and then moving it around until the base fits the curvature of the body. It is still more surprising and unexpected that when such a point is found, the mask or the lens plane of the lamp will be perpendicular to the earth, and in most cases pointing exactly to front or rear. Furthermore, in any of the positions, when an indexing lamp is used, the index marker can be rotated to the proper position, utilizing only the 30° slots provided.

In order to install an accessory, such as the signal lamp described, on an existing motor vehicle, the general area of the vehicle is located where it is desired to install the lamp. The base, preferably with a small gasket beneath it to prevent marring of the finish of the vehicle body, is then moved over the surface until a point is found where a sharp curve runs into a lesser curve. A location will there be found where the base will fit the body over the entire extent of the basal surface. The outline of the base is then marked, and with the aid of a templet, or similar device, holes are drilled in the body metal opposite bosses 4. Screws are then inserted through these holes, together with the proper washers, etc., with their ends entering the threads in bosses 4, and the screws are tightened until the lamp is firmly affixed to the vehicle body.

The installation does not require that the body metal touch the ends of bosses 4, and the natural resiliency of the body metal allows the metal to be placed under a slight tension within the area enclosed by the basal surface, thus firmly holding the lamp in position, and bosses 4 terminate sufficiently above the level of the basal surface so that various short dimension curvatures can be accommodated.

Thus, it will readily be seen that while the basal surface of the bracket of my invention has a toric curvature, the surface to which the bracket is applied will not necessarily have a cylindrical surface, and in fact, usually does not. Just so long as the curvature across the short dimension is sufficiently shallow so as not to touch the ends of bosses 4, the bracket may be successfully applied and secured to the body of the vehicle.

After the lamps have been affixed to the body, cap screw 16 is removed from the lamp house and the mask, with its index marker, is rotated until the proper slot 19 is presented to the location of pin 16. Fine adjustment is then made within the slot, the cap placed back on the lamp house, and the assembly tightened by inserting pin 16. The lamps are then ready to be connected to cable 54 as an integral part of the entire signalling circuit.

It will be obvious, however, that the base of my invention may be applied to other types of lamps wherein the particular type of indexing lens herein described is not used, and it will be just as obvious that lamps may be utilized with the composite lens of my invention, without the basal bracket herein described. I have for that reason chosen to claim these two features in separate applications, and in this application the claims are directed solely toward the bracket having the basal surface and lens plane as described above.

I claim:

1. A universal foundation support for an automobile accessory adapted to fit a plurality of areas on the majority of automotive bodies, said support having generally downwardly extending wall portions the edges of said wall portions being so formed as to lie on a toric surface curved from the front to rear of said foundation support, the longitudinal curvature of said torus being a true arc of substantially 23″ radius, said foundation support being adapted to support a display device having a display surface at a fixed angle of substantially 71° to a plane including the longest chord of said arc and parallel to the general extent of said surface whereby, when said basal surface is applied to one of said areas and fits said area, the plane of said display surface will be perpendicular to the ground plane upon which said automobile rests, and facing directly to the front or rear as mounted.

2. Apparatus in accordance with claim 1, wherein said display surface carries an index marker, and being adjustably rotatable in the plane thereof over at least a 30° arc.

3. Apparatus in accordance with claim 1, wherein said display surface carries a translucent index marker, said index marker being adjustably rotatable in the plane of said surface over at least a 30° arc, and a lamp positioned within said foundation member and positioned to direct light through said index marker to the outside.

WAGN TRAUTNER.